(12) United States Patent
Gantman et al.

(10) Patent No.: US 9,274,815 B2
(45) Date of Patent: Mar. 1, 2016

(54) METHOD AND APPARATUS FOR PORTABLE SELF-CONTAINED NODE COMPUTER

(75) Inventors: Alexander Gantman, Poway, CA (US);
Gregory Rose, San Diego, CA (US);
Jack Steenstra, San Diego, CA (US);
Liren Chen, San Diego, CA (US);
Adam J. Drew, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 495 days.

(21) Appl. No.: 12/732,461

(22) Filed: Mar. 26, 2010

(65) Prior Publication Data

US 2011/0238998 A1    Sep. 29, 2011

(51) Int. Cl.
*G06F 9/455*    (2006.01)

(52) U.S. Cl.
CPC ...................... *G06F 9/455* (2013.01)

(58) Field of Classification Search
USPC ............................................................. 726/1
See application file for complete search history.

(56) References Cited

U.S. PATENT DOCUMENTS

| | | | | |
|---|---|---|---|---|
| 5,440,699 A * | 8/1995 | Farrand et al. | ................ | 715/740 |
| 6,081,856 A * | 6/2000 | Comer | ............................. | 710/67 |
| 6,327,613 B1 * | 12/2001 | Goshey et al. | ................ | 709/208 |
| 6,564,246 B1 * | 5/2003 | Varma et al. | ................... | 709/205 |
| 6,636,929 B1 * | 10/2003 | Frantz et al. | .................. | 710/313 |
| 7,058,971 B1 * | 6/2006 | Horikiri | ............................. | 726/7 |
| 2005/0278442 A1 * | 12/2005 | Motoyama et al. | ........... | 709/224 |
| 2007/0124536 A1 * | 5/2007 | Carper | ........................... | 711/115 |
| 2007/0294335 A1 * | 12/2007 | Gershom | ....................... | 709/203 |

FOREIGN PATENT DOCUMENTS

| | | |
|---|---|---|
| CN | 1573720 A | 2/2005 |
| JP | 2007518186 A | 7/2007 |
| JP | 2008276790 A | 11/2008 |
| JP | 2008287703 A | 11/2008 |
| JP | 2009518702 A | 5/2009 |
| JP | 2009211640 A | 9/2009 |
| KR | 20080078820 A | 8/2008 |
| WO | WO-2007056476 A2 | 5/2007 |
| WO | WO-2008094369 A2 | 8/2008 |

OTHER PUBLICATIONS

International Search Report and Written Opinion—PCT/US2011/029448, ISA/EPO—Jun. 29, 2011.
Taiwan Search Report—TW100109937—TIPO—Feb. 9, 2014.

* cited by examiner

*Primary Examiner* — Michael Chao
*Assistant Examiner* — Devin Almeida
(74) *Attorney, Agent, or Firm* — Brian Lambert

(57) ABSTRACT

A portable self-contained node apparatus establishes a connection to a host apparatus having one or more peripheral devices connected directly thereto. The node apparatus is configured to view the one or more peripheral devices while being unaware of the host apparatus, and to act as a master device interacting directly with the one or more peripheral devices.

56 Claims, 9 Drawing Sheets

METHOD AND APPARATUS FOR PORTABLE SELF-CONTAINED NODE COMPUTER

BACKGROUND

1. Field

This application relates generally to computing devices, and more particularly to portable node computers.

2. Background

Computing devices, such as personal computers, laptops, mobile telephones, etc., have differing capabilities. For example, computers are often configured to run one particular operating system, such as Microsoft Windows or Mac OS. Mobile phones often have various optional features. It would be desirable to have a way of expanding the capabilities of a computing device.

SUMMARY

In one aspect of the disclosure, a portable computing apparatus comprises a processing system, comprising a first operating system, is configured to establish a connection to a host computing device, wherein the host apparatus is configured to present itself to the node apparatus as one or more peripheral devices, and wherein the node apparatus acts as a master device interacting directly with the one or more peripheral devices.

In another aspect of the disclosure, an apparatus comprises means establishing a connection to a host computing device, wherein the host apparatus is configured to present itself to the node apparatus as one or more peripheral devices, and wherein the node apparatus acts as a master device interacting directly with the one or more peripheral devices.

In another aspect of the disclosure, a method of computing using a node apparatus comprises establishing a connection to a host apparatus, wherein the host apparatus is configured to present itself to the node apparatus as one or more peripheral devices, and wherein the node apparatus acts as a master device interacting directly with the one or more peripheral devices.

In another aspect of the disclosure, a host apparatus comprises a processing system comprising a first operating system, wherein the processing system is configured to establish a connection to one or more node apparatuses; and to provide virtual access to one or more peripheral devices to the one or more node apparatuses, wherein the node apparatus acts as a master device interacting directly with one or more peripheral devices.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects of apparatuses and methods, and the environments in which they operate, will be described below. The apparatuses and methods, however, may be embodied in many different forms and should not be construed as limited to the various configurations presented throughout this disclosure. Rather, the various aspects of these apparatuses and methods are provided so that this disclosure will be thorough and complete, and will fully convey the scope of the present invention to those skilled in the art. As those skilled in the art will readily appreciate, various details may be presented for the purpose of providing a thorough understanding of the apparatuses and methods, however, various configurations of these apparatuses and steps of the methods may be implemented without these specific details. In some instances, well-known structures and components are shown in block diagram form in order to avoid obscuring the various concepts presented throughout this disclosure.

Figure 1:
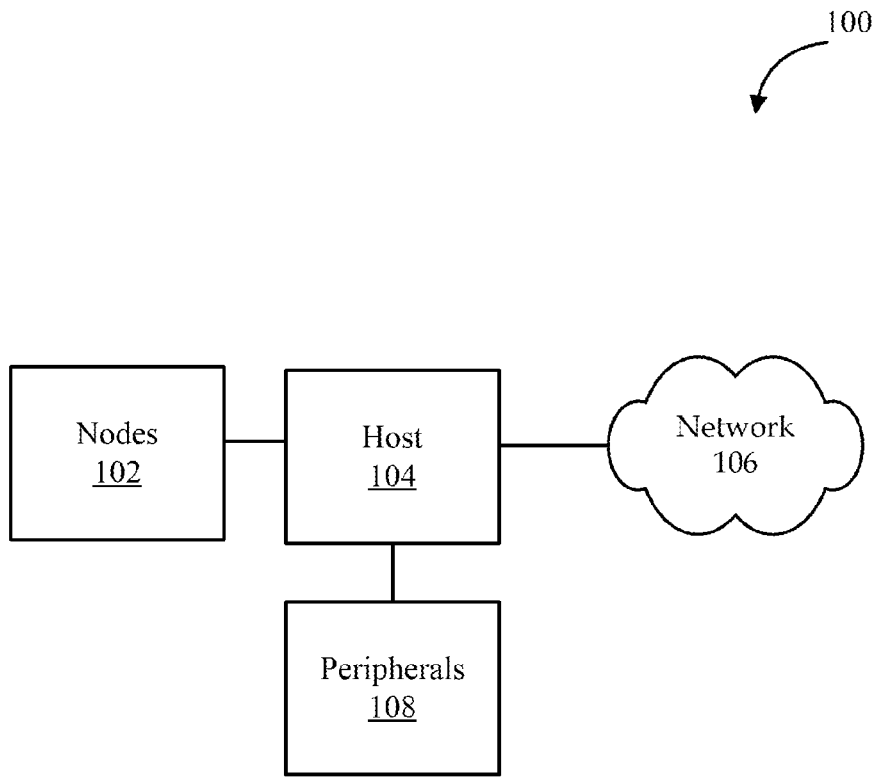
FIG. 1 depicts a communications system.

Various aspects of apparatuses and methods will now be presented with reference to a communications system. As depicted in FIG. 1, a communication system 100 may comprise one or more node apparatuses 102 connected to a host apparatus 104. Host apparatus 104 may be connected to a network 106 via known wired or wireless connectivity protocols.

Host apparatus 104 may have associated therewith one or more peripheral devices 108. These peripheral devices 108 may include, for example, a monitor, display, keyboard, mouse, printer, a hard disk drive, a network card, and/or other peripheral devices. Node apparatuses 102 may access peripheral devices 108 via host apparatus 104. That is, host apparatus 104 may present its peripheral devices 108 to node apparatuses 102 as though the peripheral devices 108 are directly connected to the node apparatus 102. Accordingly, the node apparatus 102 acts as a master device when interacting with the peripherals. The node apparatus 102 may not be aware of the host apparatus 104 or any other node apparatuses connected to the host. Host apparatus 104 may be, for example, a personal computer, server, cellular phone, personal digital assistant, portable gaming device, monitor, television, mobile phone, digital camera, and/or any other electronic device. The node apparatuses 102 and host apparatus 104 may be connected using any communications protocol such as, for example, USB, Ethernet, etc.

Each node apparatus 102 may be a small, self-contained computing device. For example, the node apparatus 102 may be a USB fob, a DIMM, a compact flash card, and/or any other small, self-contained computing device. Node apparatuses 102 may receive power from host apparatus 104, and may also rely on the network connection and peripheral devices of host apparatus 104.

Figure 2:
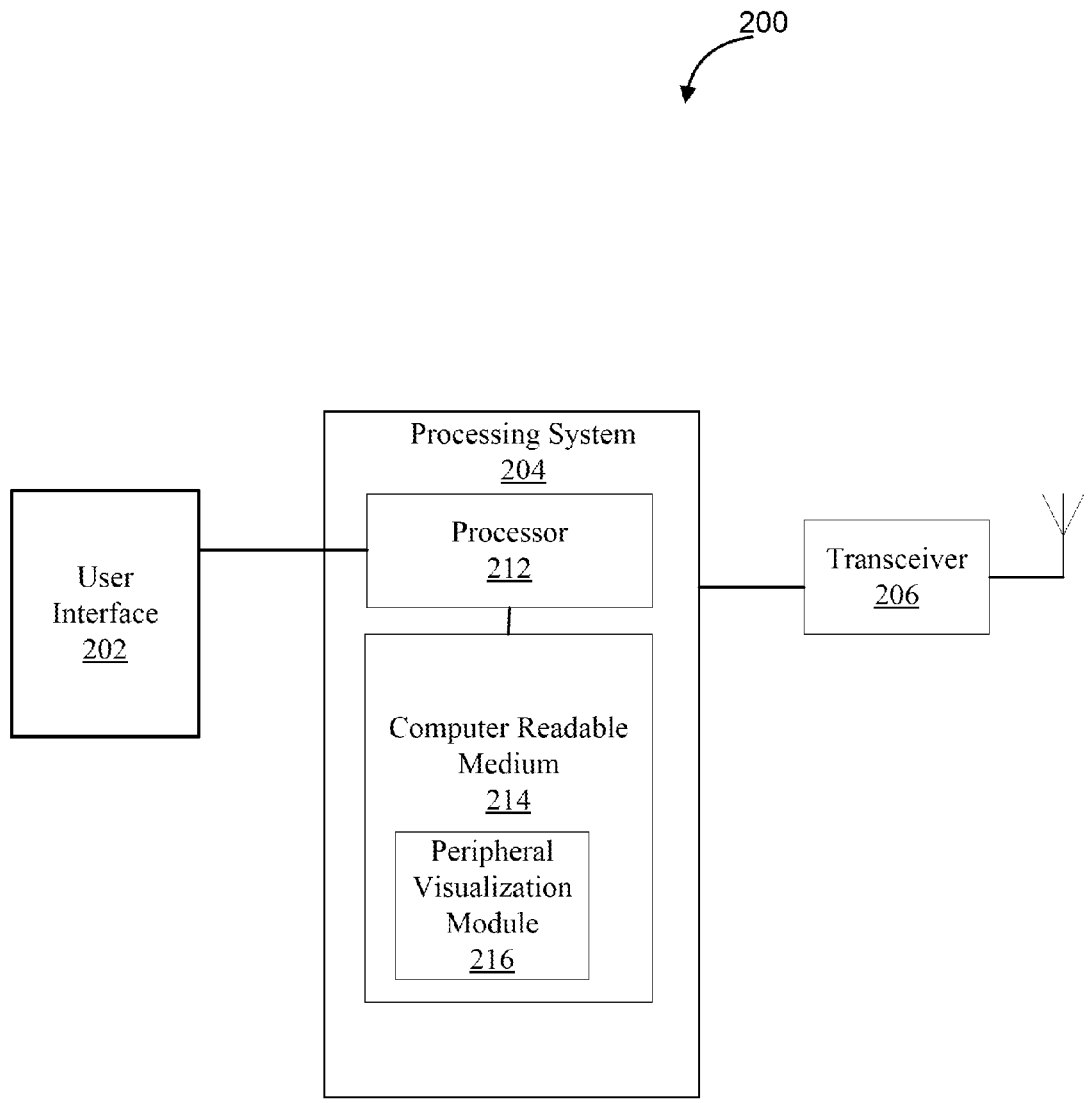
FIG. 2 is a conceptual block diagram of a host apparatus.

FIG. 2 is a conceptual block diagram illustrating an example of a host apparatus 200. In this example, the host apparatus 200 is shown with a user interface 202 (e.g., a keyboard, display, speaker, microphone, joystick, and/or any other combination user interface devices), a processing system 204, and a transceiver 206. The processing system 204 may have one or more processors represented generally by processor 212 and a computer readable medium (e.g., memory) 214.

The processing system 204 may be implemented using software, hardware, or a combination of both. By way of example, the processor 212 may be implemented with one or more, or any combination of, microprocessors, digital signal processors (DSP), application specific integrated circuits (ASIC), microcontrollers, field programmable gate arrays (FPGA) or other programmable logic, state machines, discrete gates, transistor logic, discrete hardware components, or some other processing entity designed to perform the various functions presented throughout this disclosure. Those skilled in the art will recognize how best to implement the described functionality for the processing system 204 depending on the particular application and the overall design constraints imposed on the overall system.

Software shall be construed broadly to mean instructions, data, or any combination thereof, whether referred to as software, firmware, middleware, microcode, hardware description language, or otherwise. Computer readable medium 214 may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The computer readable medium 214 may be embodied in a computer product. The computer product may comprise packaging materials.

In the conceptual illustration presented in FIG. 2, the computer readable medium 214 is shown as part of the processing system 204 separate from the processor 212. However, as those skilled in the art will readily appreciate, the computer readable medium 214, or any portion thereof, may be external to the processing system 204. By way of example, the computer readable medium 214 may include a transmission line, a carrier wave modulated by data, and/or a computer product separate from the host apparatus 200, all which may be accessed by the processor 212 through an interface (not shown). Alternatively, or in addition to, the computer readable medium 214, or any portion thereof, may be integrated into the processor 212, such as the case may be with cache and/or general register files.

Transceiver 206 may provide a transmitting and/or a receiving function. The transmitting function modulates a carrier with data for transmission over the wireless medium and the receiving function demodulates a carrier received over the wireless medium to recover data. Transceiver 206 may also provide various other functions, such as RF front-end processing, analog/digital conversion, timing and frequency estimation, channel estimation, modulation coding scheme (MCS), etc.

The processor 212 provides general processing functions, including the execution of software stored on the computer readable medium 214. The software includes instructions that when executed by the processor 212, cause the processing system 204 to perform the various functions presented throughout this disclosure.

The functions and methods described herein may be implemented by various modules in the wireless device. As used in this disclosure, the term "modules" is intended to refer to either hardware, firmware, a combination of hardware and software, software, or software in execution. By way of example, a module may be a process, an object, an executable, a thread of execution, a program, an application, a routine, a subroutine, a block of code or instructions, or any other software executed by the processor 212 or by another processing device. In this example, these modules may reside in the computer readable medium 214 which represents a single storage device, multiple storage devices, or other media. By way of example, a module may be loaded into RAM from a larger storage device prior to execution. During execution, the processor 212 may load the module, or any portion thereof into cache to increase access speed. One or more cache lines may then be loaded into a general register file for execution by the processor 212. When referring to the functionality of a module in software applications, it will be understood that such functionality may be implemented by the processor 212 when executing the module, or any portion thereof. Computer readable medium 214 may include, for example, a peripheral visualization module 216. This module may be configured to enable a node apparatus to establish a connection to host 200, and to access any peripheral devices associated with host 200. For video, for example, the output of a node apparatus may appear as a window on a monitor associated with host apparatus 200. For networking, host apparatus 200 may act as a router for a node apparatus. Peripheral visualization module 216 may also provide shared access to the host's clipboard and/or other inter-node communication services.

In some implementations, the host apparatus may be a simple mobile telephone having only basic functionality. A node apparatus may be configured having stored thereon a mobile telephone operating system, and one or more mobile phone applications. The node apparatus may be used to extend the functionality of the host apparatus.

Figure 3:
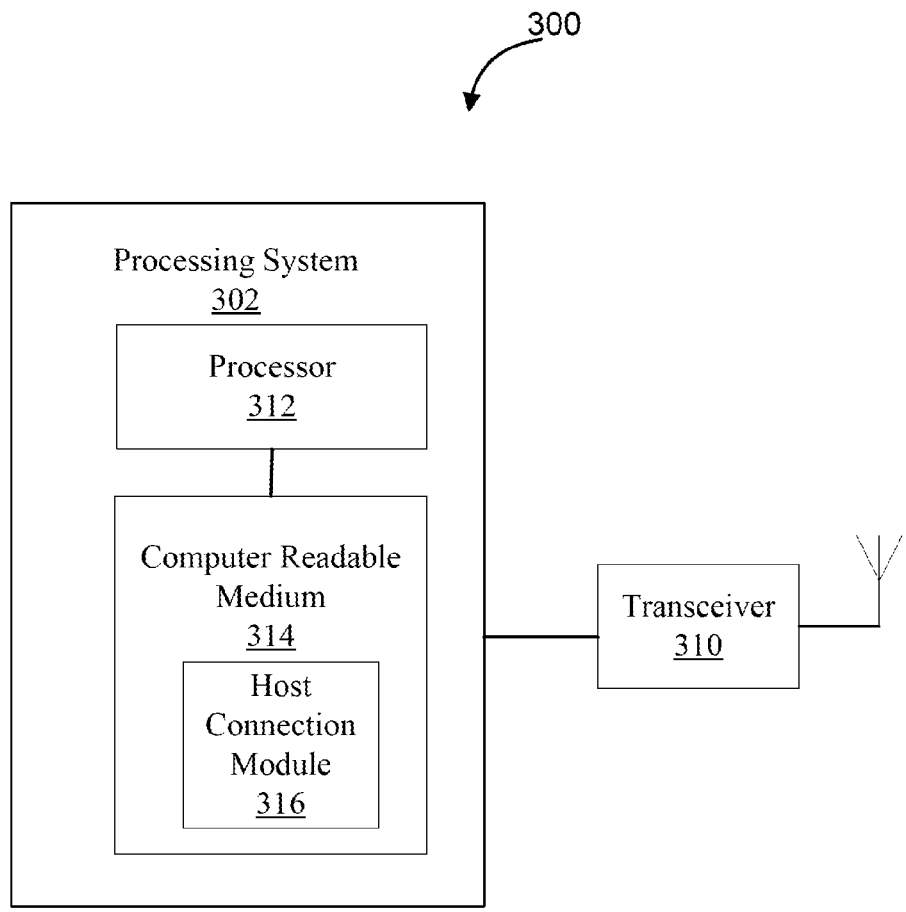
FIG. 3 is a conceptual diagram of a node apparatus.

FIG. 3 is a conceptual block diagram of a node apparatus 300. Node apparatus 300 is shown with a processing system 302 and a transceiver 310. Processing system 302 includes a processor 312 and a computer readable medium 314. Processing system 302 and transceiver 310 operate similar to the processing system 204 and transceiver 206 of host apparatus 200. As such, further description of these elements is omitted. Computer readable medium 314 may include a host connection module 316 that enables the node to connect to and access the resources of a host apparatus.

Figure 4:
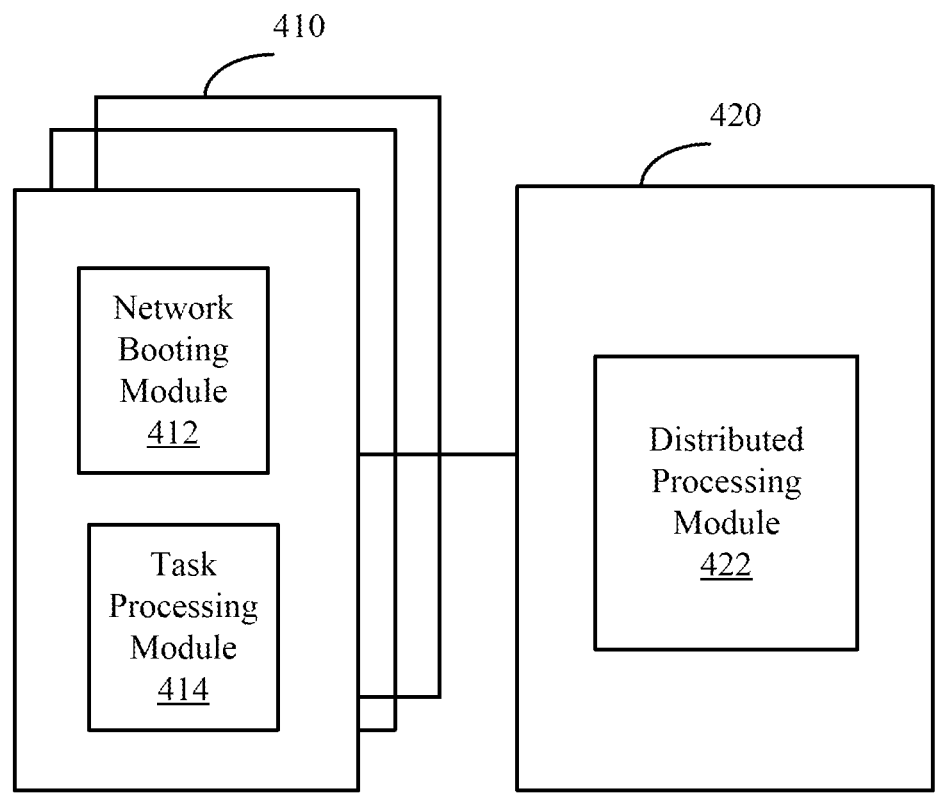
FIG. 4 is a conceptual block diagram of a communications system.

FIG. 4 depicts one exemplary configuration wherein a plurality of node apparatuses is connected to a host device in a server farm. Typically, numerous servers are housed in a room to provide network operations for an organization. The larger number of server computers generate a large amount of heat and consume a large amount of power. By connecting a plurality of node apparatuses to a single host, a reduction in heat and power can be realized.

As depicted in FIG. 4, a plurality of nodes 410 is connected to a host 420. Network connectivity and power may be provided to nodes 410 by host 420. Each node has a processing system 302. As described above, processing system 302 may include one or more processors and a computer readable medium. Similarly, host 420 comprises a processing system 204. The functions of the plurality of modules associated with each of nodes 410 and host 420 may be executed by the respective processors, and may reside in the respective computer readable mediums.

Network booting module 412 may use the network connection provided by host 420 to perform a network booting operation. Nodes 410 and host 420 may be configured as a distributed processing system. Host 420 may include a distributed processing module 422 which dispatches processing jobs to each node 410. Task processing module 414 processes the assigned jobs.

In some configurations, node apparatuses may be configured as micro-computers. Each node apparatus may operate a particular operating system which may be different from that of the host device. This enables a single host device, such as a personal computer, to operate using different operating systems. For example, a personal computer using the Windows operating system may have connected thereto a first node apparatus running Linux and a second node apparatus running Mac OS. A user of the personal computer can use all three operating systems on one personal computer.

Figure 5:
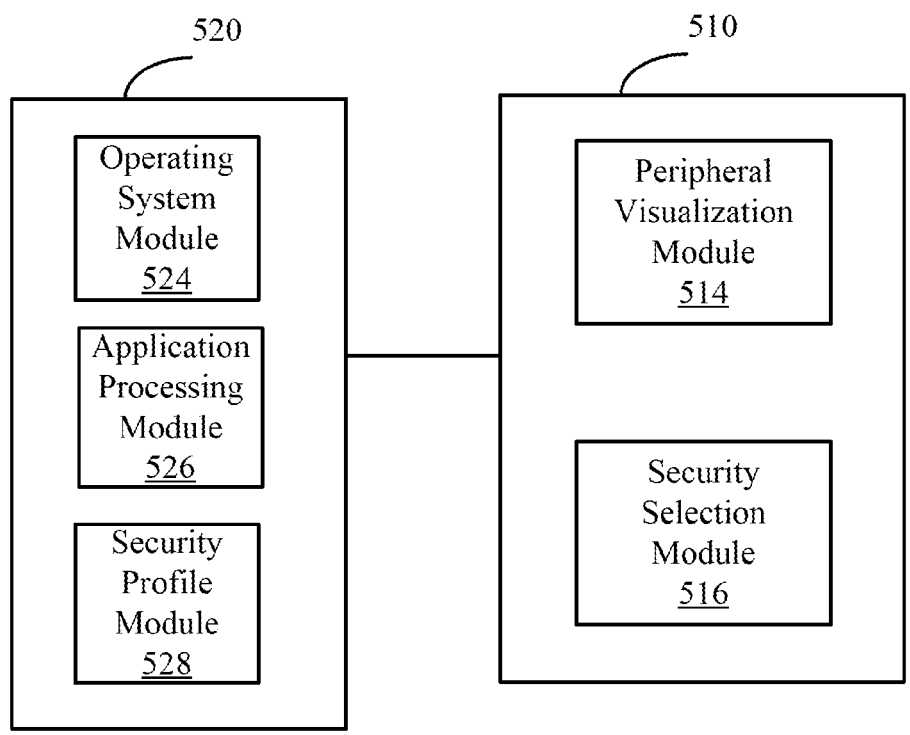
FIG. 5 is another conceptual block diagram of another communications system.

FIG. 5 is a conceptual block diagram showing a host apparatus 510 having connected thereto a node apparatus 520. Host apparatus 510 includes a processing system, which runs a plurality of modules including a peripheral visualization module 514. Node apparatus 520 includes a processing system which runs a plurality of modules including operating system module 524.

Peripheral visualization module 514, as described above with respect to FIG. 2, enables a node apparatus to establish a connection to a host apparatus, and to access the peripheral devices associated with the host apparatus. While only a single node apparatus is shown in FIG. 5, multiple node apparatuses may be provided. The node apparatus may be unaware of the host device or other connected nodes. As such, different operating systems may be used without compatibility restrictions on the hardware or software platforms of the host device.

Operating system module 524 provides a pre-configured operating system. The operating system may be, for example, Windows, Linux, Mac, Unix, and/or any other operating system. In addition to operating as a general purpose computer, as described in relation to FIG. 5, a node apparatus may be configured as an application distribution, execution, and copy-protection device. That is, the node may be dedicated to a specific application or suite of applications. Application processing module 526 may be provided to execute the application or suite of applications. The node may be a self contained micro-computer distinct from the operating system of the host device, or may rely on specific application programming interfaces (APIs) of the host device. A software vendor may sell applications pre-installed on a node apparatus. The applications may run directly from the node apparatus when connected to a host device. This allows a user to easily transport all necessary programs and have access to those programs from any computing device. Some applications may require large amounts of data. For example, financial management programs such as Quicken or Microsoft Money store large amounts of financial data. A node apparatus may be configured to encrypt and digitally sign the data, and store the data in an on-line data storage service.

Node apparatus 520 may also have associated therewith a security profile module 528. This module may be used to set access permission for the node apparatus. For example, the security profile module 528 may indicate whether node apparatus 520 has access to any of files or storage components of host apparatus 510. The security profile module 528 may partition the node into different security domains depending on the type of process being performed by the device. For example, accessing certain websites may not allow the node apparatus to access any of the host's files or directories. Security selection module 516, included in host 510, may be configured to detect the security profile associated with a connect node, and to provide access to resources such as the file system based on the security profile.

Figure 6:
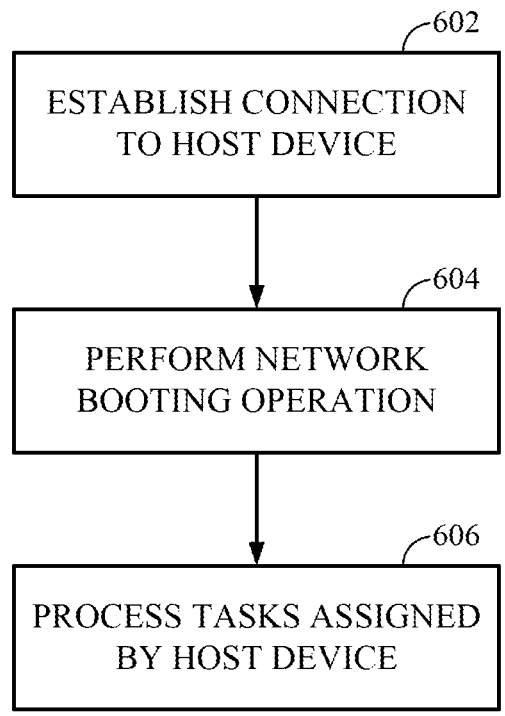
FIG. 6 is a flowchart depicting a communication process.

FIG. 6 depicts an exemplary process that may be implemented by a node device. As depicted at 602, the node device may establish a connection to a host apparatus. In some instances, the node device may be a self-contained, removable computing device such as, for example, a USB fob, a compact flash drive, and/or any other device. The connection may be established using the protocols associated with the device when the device is plugged into, or otherwise connected to, the host apparatus.

In some implementations, one or more nodes may be connected to a host, and the host and node(s) operate in a distributed manner. As depicted at 604, a node device may perform a network booting operation via a network connection provided by the host apparatus. As depicted at 606, the node(s) may then perform one or more tasks assigned by the host device. The host device may dispatch processing jobs to the node(s) via the network connection.

Figure 7:
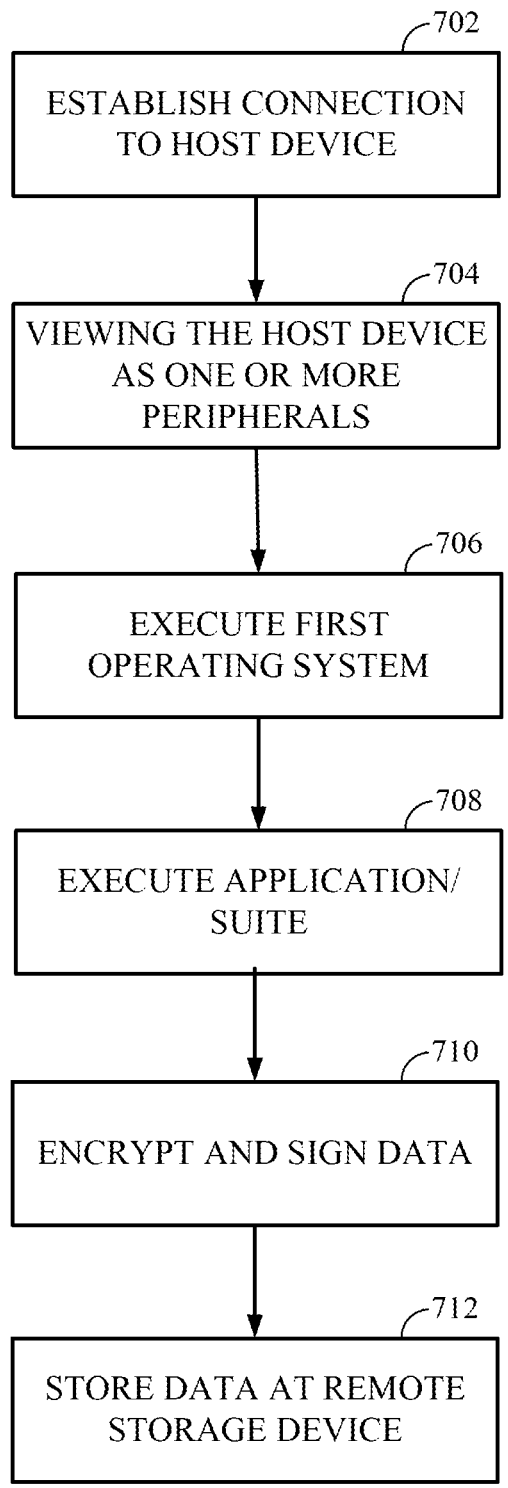
FIG. 7 is a flowchart depicting another communication process.

FIG. 7 depicts another exemplary process that may be implemented by a node device. As depicted at 702, the node device may establish a connection to a host apparatus. This connection establishment process may be performed in the same manner as described above in reference to FIG. 6.

A node device may be configured as a micro-computer without any peripherals. As depicted at 704, upon establishing a connection to a host device, the node device may view the host device as one or more peripherals directly connected to the node. For example, the node device may interact with a monitor connected to the host device as if the monitor were directly connected to the node. The node device may be configured with an operating system, and the operating system may be different from that of a host device to which the node is connected. As depicted at 706, the node device may execute a first operating system. The operating system may be executed in a window presented by the host device. The node device may view the window as being an actual monitor to which it is directly connected.

In some implementations, a node device may be configured to run a particular application or suite of applications. Thus, as depicted at 708, the node device may execute the application or suite of applications. The node device accesses and interacts with peripheral devices associated with the host apparatus as though directly connected to the peripheral devices. Thus, depending upon the application, the node device, when executing the application, may access a window presented by the monitor, a keyboard connected to the host device, a mouse, the host's file system, etc.

According to some aspects of the invention, a large amount of data may be generated when executing the application or suite of applications. As depicted at 710, the node apparatus may encrypt and digitally sign data generated during the execution of the application or suite of applications. As depicted at 712, the encrypted and digitally signed data may be stored at a remote storage device, such as, for example, an online-accessible storage device.

Figure 8:
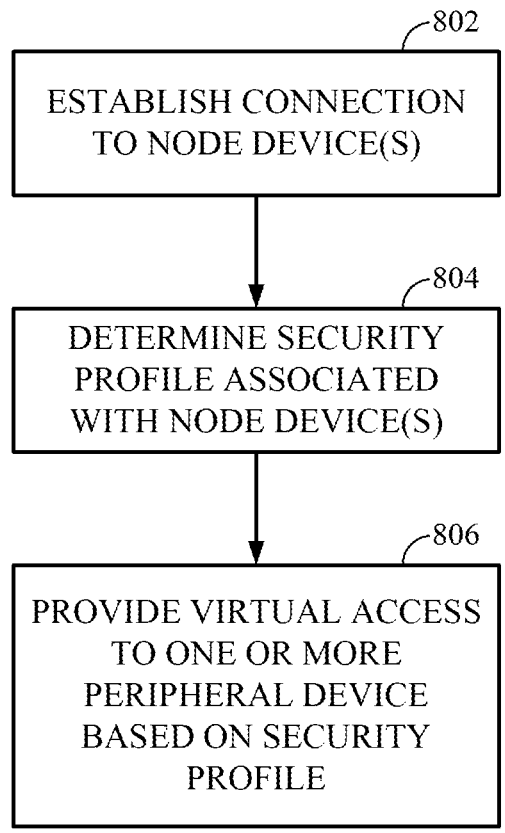
FIG. 8 is a flowchart depicting yet another communication process.

FIG. 8 depicts an exemplary process that may be implemented by a host device. As depicted at 802, the host device may establish a connection to one or more devices. Each node device may be configured according to a particular security profile. The nodes may be used for network-facing applications such as, for example, web browsers. Some nodes may be configured for use only within a corporate intranet, for example, while others are configured for browsing the internet. The level of security associated with a node may depend on the particular types of web pages to be accessed. As depicted at 804, the host device may determine the security profile associated with a connected device.

Based on the determined security profile, the host device may determine which one or more peripheral devices the node is allowed virtual access to, as depicted at 806. For example, a node configured only for use with an intranet may be allowed to access the file system associated with the host. However, a node device used to access hacking websites or other potentially dangerous content may be prohibited from accessing the file system.

Figure 9:
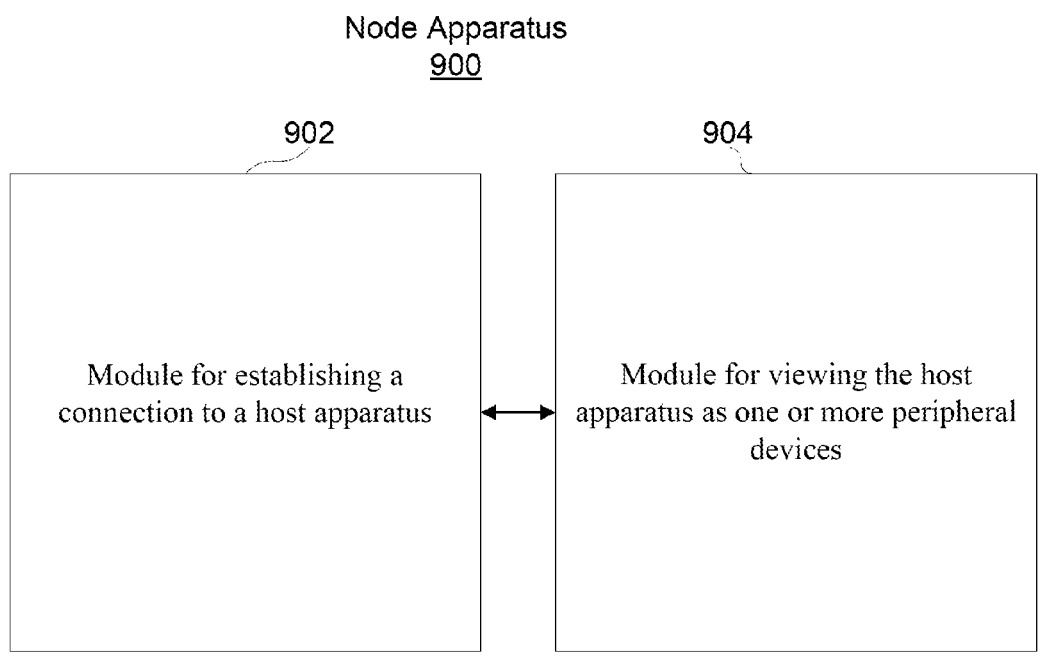
FIG. 9 is another conceptual block diagram of a node apparatus.

FIG. 9 is a block diagram illustrating an example of the functionality of a node apparatus 900. In this example, the node apparatus 900 includes a module 902 for establishing a connection to a host apparatus, and a module 904 for viewing the host apparatus as one or more peripheral devices.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A node apparatus, comprising:
    a memory comprising a first operating system; and
    at least one processor coupled to the memory and configured to:
        establish a connection to a host apparatus having one or more peripheral devices connected directly thereto;
        process one or more tasks assigned by the host apparatus;
        view the one or more peripheral devices;
        interact directly with the one or more peripheral devices,
        operate a dedicated application or suite of applications, wherein the application or suite of applications is stored on the node apparatus and is executed directly from the node apparatus when connected to the host apparatus,
        encrypt and digitally sign data generated during the execution of the application or suite of applications; and
        store the encrypted and digitally signed data at a remote storage device, the remote storage device being an online storage device.

2. The node apparatus of claim 1, wherein the at least one processor is further configured to perform a network booting operation via a network connection provided by the host apparatus.

3. The node apparatus of claim 1, wherein the at least one processor is further configured to access one or more resources associated with the host apparatus based on a pre-configured security profile.

4. The node apparatus of claim 1, wherein the one or more peripheral devices comprises one or more of a mouse, a hard disk drive, or a network card connected directly to the host apparatus.

5. The node apparatus of claim 1, wherein the host apparatus has associated therewith a second operating system different from the first operating system.

6. The node apparatus of claim 5, wherein the first operating system is accessed in a window of a monitor of the host apparatus.

7. The node apparatus of claim 1, wherein the host apparatus comprises one of a personal computer, a server, or a personal digital assistant.

8. The node apparatus of claim 1, wherein the host apparatus comprises a mobile telephone and wherein the node apparatus is associated with a mobile telephone operating system used to operate the host apparatus.

9. The node apparatus of claim 8, wherein the at least one processor further comprises an application processor and the memory includes one or more applications, the one or more applications being accessible via the host apparatus.

10. The node apparatus of claim 1, wherein the at least one processor is configured to establish the connection to the host apparatus via a USB connection.

11. The node apparatus of claim 1, wherein the node apparatus is a self contained USB fob.

12. The node apparatus of claim 1, wherein the at least one processor is configured to establish a connection to the host apparatus via an Ethernet connection.

13. The node apparatus of claim 1, wherein the memory further comprises a security profile that partitions the node apparatus into multiple levels of security associated with the host apparatus depending on a type of process being performed by the node apparatus.

14. The node apparatus of claim 13, wherein the type of process includes accessing a web page, and wherein a level of security associated with the node apparatus changes based on the web page accessed by the node apparatus.

15. A node apparatus comprising:
    means for establishing a connection to a host apparatus having one or more peripheral devices connected directly thereto;
    means for processing one or more tasks assigned by the host apparatus;
    means for viewing the one or more peripheral devices;
    means for operating a dedicated application or suite of applications, wherein the application or suite of applications is stored on the node apparatus and is executed directly from the node apparatus when connected to the host apparatus;
    means for encrypting and digitally signing data generated during the execution of the application or suite of applications; and
    means for storing the encrypted and digitally signed data at a remote storage device, wherein the remote storage device is an online storage device,
    wherein the node apparatus acts as a master device interacting directly with the one or more peripheral devices.

16. The node apparatus of claim 15, further comprising:
    means for performing a network booting operation via a network connection provided by the host apparatus.

17. The node apparatus of claim 15, further comprising:
    means for accessing one or more resources associated with the host apparatus based on a pre-configured security profile.

18. The node apparatus of claim 15, wherein the one or more peripheral devices comprises one or more of a mouse, a hard disk drive, or a network card connected directly to the host apparatus.

19. The node apparatus of claim 15, further comprising:
    means for executing a first operating system, the host apparatus having associated therewith a second operating system different from the first operating system.

20. The node apparatus of claim 19, wherein the first operating system is accessed in a window of a monitor of the host apparatus.

21. The node apparatus of claim 15, wherein the host apparatus comprises one of a personal computer, a server, a mobile telephone, or a personal digital assistant.

22. The node apparatus of claim 15, wherein the host apparatus comprises a mobile telephone, the node apparatus further comprising:
    means for implementing a mobile telephone operating system to operate the host apparatus.

23. The node apparatus of claim 15, further comprising:
    means for establishing a connection to the host apparatus via a USB connection.

24. The node apparatus of claim 15, further comprising:
    means for establishing a connection to the host apparatus via an Ethernet connection.

25. A method of computing using a node apparatus, comprising:

establishing a connection to a host apparatus having one or more peripheral devices connected directly thereto;
processing one or more tasks assigned by the host apparatus;
viewing the one or more peripheral devices;
operating a dedicated application or suite of applications, wherein the application or suite of applications is stored on the node apparatus and is executed directly from the node apparatus when connected to the host apparatus;
encrypting and digitally signing data generated during the execution of the application or suite of applications; and
storing the encrypted and digitally signed data at a remote storage device, wherein the remote storage device is an online storage device, and
wherein the node apparatus acts as a master device interacting directly with the one or more peripheral devices.

26. The method of claim 25, further comprising:
performing a network booting operation via a network connection provided by the host apparatus.

27. The method of claim 25, further comprising:
accessing one or more resources associated with the host apparatus based on a pre-configured security profile.

28. The method of claim 25, wherein the one or more peripheral devices comprises one or more of a mouse, a hard disk drive, or a network card connected directly to the host apparatus.

29. The method of claim 25, further comprising:
executing a first operating system, the host apparatus having associated therewith a second operating system different from the first operating system.

30. The method of claim 29, wherein the first operating system is accessed in a window of a monitor of the host apparatus.

31. The method of claim 25, wherein the host apparatus comprises one of a personal computer, a server, a mobile telephone, or a personal digital assistant.

32. The method of claim 25, wherein the host apparatus comprises a mobile telephone, and wherein the method further comprises:
implementing a mobile telephone operating system stored on the node apparatus to operate the host apparatus.

33. The method of claim 25, wherein establishing a connection to the host apparatus comprises establishing a connection via a USB connection.

34. The method of claim 25, wherein establishing a connection to the host apparatus comprises establishing a connection via an Ethernet connection.

35. A computer program product, comprising:
a non-transitory computer-readable medium comprising:
at least one set of codes for causing a computer to establish a connection to a host apparatus having one or more peripheral devices connected directly thereto;
at least one set of codes for causing the computer to process one or more tasks assigned by the host apparatus;
at least one set of codes for causing the computer to view the one or more peripheral devices;
at least one set of codes for causing the computer to operate a dedicated application or suite of applications, wherein the application or suite of applications is stored on the computer and is executed directly from the computer when connected to the host apparatus;
at least one set of codes for causing the computer to encrypt and digitally sign data generated during the execution of the application or suite of applications; and
at least one set of codes for causing the computer to store the encrypted and digitally signed data at a remote storage device, wherein the remote storage device is an online storage device, and
wherein the computer acts as a master device interacting directly with the one or more peripheral devices.

36. The computer program product of claim 35, further comprising:
at least one set of codes for causing the computer to perform a network booting operation via a network connection provided by the host apparatus.

37. The computer program product of claim 35, further comprising:
at least one set of codes for causing the computer to access one or more resources associated with the host apparatus based on a pre-configured security profile.

38. The computer program product of claim 35, wherein the one or more peripheral devices comprises one or more of a mouse, a hard disk drive, or a network card connected directly to the host apparatus.

39. The computer program product of claim 35, wherein the computer is configured with a first operating system different from a second operating system associated with the host apparatus.

40. The computer program product of claim 39, wherein the first operating system is accessed in a window of a monitor of the host apparatus.

41. The computer program product of claim 35, wherein the host apparatus comprises one of a personal computer, a server, or a personal digital assistant.

42. The computer program product of claim 35, wherein the host apparatus comprises a mobile telephone.

43. The computer program product of claim 35, wherein the computer is a self contained USB fob.

44. A host apparatus, comprising:
a memory comprising an operating system; and
at least one processor coupled to the memory and configured to:
establish a connection to one or more node apparatuses;
assign processing tasks to at least one of the one or more node apparatuses;
establish a direct connection to one or more peripheral devices;
provide virtual access to the one or more peripheral devices to the one or more node apparatuses; and
determine a security profile associated with each of the one or more node apparatuses, the security profile indicating a type of access to be provided to the one or more node apparatuses, wherein the type of access changes based on a process to be performed by the one or more node apparatuses, and wherein the security profile indicates that the type of access changes based on whether the process is performed.

45. The host apparatus of claim 44, wherein the at least one processor is further configured to provide a power source to the one or more node apparatuses.

46. The host apparatus of claim 44, wherein the at least one processor is further configured to provide a network connection to the one or more node apparatuses.

47. The host apparatus of claim 44, wherein the at least one processor is further configured to:
provide access to a file system to the one or more node apparatuses based on the security profile.

48. The host apparatus of claim 44, wherein the one or more peripheral devices comprises one or more of a mouse, a hard disk drive, or a network card connected directly to the host apparatus.

49. The host apparatus of claim 44, wherein at least one of the one or more node apparatuses has associated therewith a second operating system different from that of the host apparatus.

50. The host apparatus of claim 44, wherein the at least one processor is further configured to provide virtual access to a monitor attached to the host apparatus by presenting a display window.

51. The host apparatus of claim 44, wherein the host apparatus comprises one of a personal computer, a server, a personal digital assistant, and a mobile telephone.

52. The host apparatus of claim 44, wherein the security profile associated with each of the one or more node apparatus is stored on the respective one or more node apparatuses.

53. The host apparatus of claim 52, wherein the security profile indicates that the type of access to the one or more peripheral devices on the host apparatus changes based on a web page being accessed by the respective one or more node apparatuses.

54. A host apparatus, comprising:
   means for establishing a connection to one or more node apparatuses;
   means for assigning processing tasks to at least one of the one or more node apparatuses;
   means for establishing a direct connection to one or more peripheral devices;
   means for providing virtual access to the one or more peripheral devices to the one or more node apparatuses; and
   means for determining a security profile associated with each of the one or more node apparatuses, the security profile indicating a type of access to be provided to the one or more node apparatuses, wherein the type of access changes based on a process to be performed by the one or more node apparatuses, and wherein the security profile indicates that the type of access changes based on whether the process is performed.

55. A method of computing using a host apparatus, comprising:
   establishing a connection to one or more node apparatuses;
   assigning processing tasks to at least one of the one or more node apparatuses;
   establishing a direct connection to one or more peripheral devices;
   providing virtual access to the one or more peripheral devices to the one or more node apparatuses; and
   determining a security profile associated with each of the one or more node apparatuses, the security profile indicating a type of access to be provided to the one or more node apparatuses, wherein the type of access changes based on a process to be performed by the one or more node apparatuses, and wherein the security profile indicates that the type of access changes based on whether the process is performed.

56. A computer product in a host apparatus, comprising:
   a non-transitory computer-readable medium comprising:
      at least one set of codes for causing the host apparatus to establish a connection to one or more node apparatuses;
      at least one set of codes for causing the host apparatus to assign processing tasks to at least one of the one or more node apparatuses;
      at least one set of codes for causing the host apparatus to establish a direct connection to one or more peripheral devices;
      at least one set of codes for causing the host apparatus to provide virtual access to the one or more peripheral devices to the one or more node apparatuses; and
      at least one set of codes for causing the host apparatus to determine a security profile associated with each of the one or more node apparatuses, the security profile indicating a type of access to be provided to the one or more node apparatuses, wherein the type of access changes based on a process to be performed by the one or more node apparatuses, and wherein the security profile indicates that the type of access changes based on whether the process is performed.

\* \* \* \* \*